A. R. CLARKSON.
POLE BRACE.
APPLICATION FILED JAN. 25, 1908. RENEWED FEB. 10, 1909.
917,249.  Patented Apr. 6, 1909.
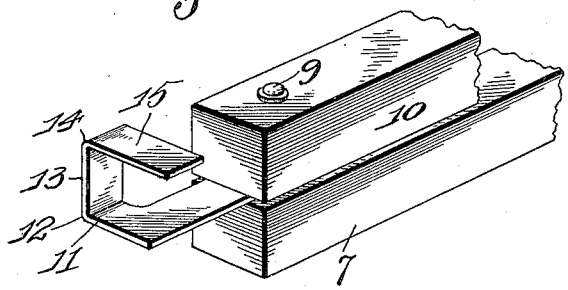
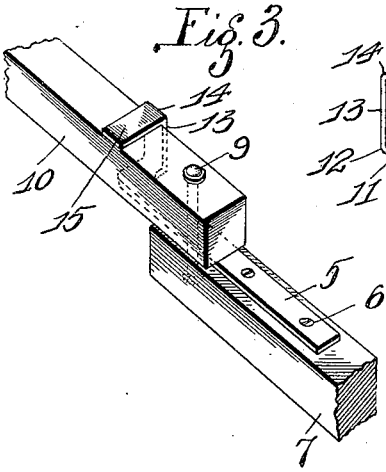
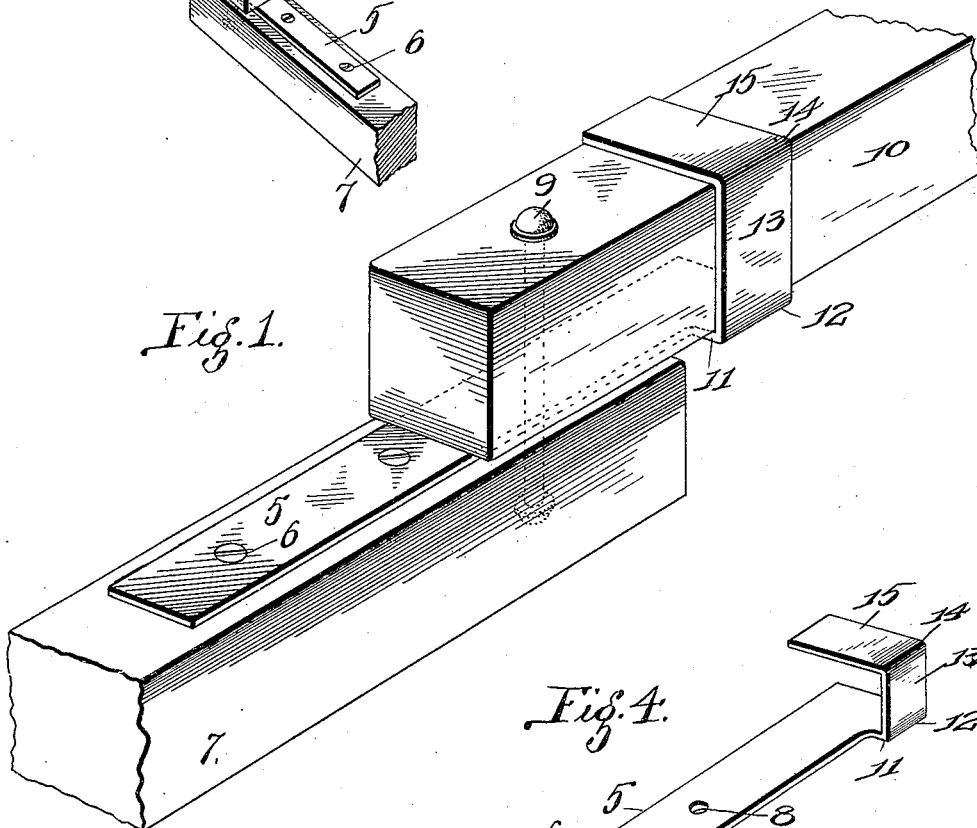
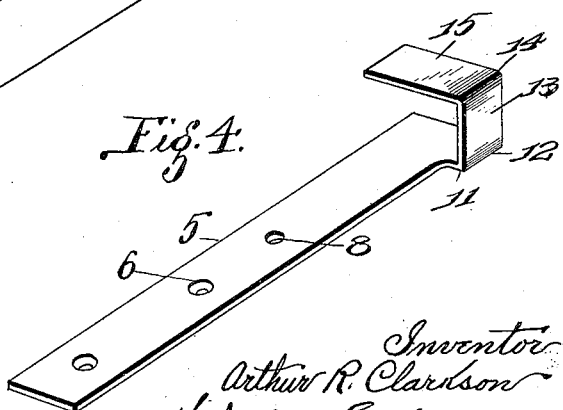
Witnesses
W. C. Stein
L. A. L. McIntyre
Inventor
Arthur R. Clarkson
by Hopkins & Eicks, Attys.

UNITED STATES PATENT OFFICE.

ARTHUR R. CLARKSON, OF ST. LOUIS, MISSOURI, ASSIGNOR TO MOUND CITY DUCK & RUBBER COMPANY, OF ST. LOUIS, MISSOURI, A CORPORATION OF MISSOURI.

POLE-BRACE.

No. 917,249.　　　Specification of Letters Patent.　　　Patented April 6, 1909.

Application filed January 25, 1908, Serial No. 412,935. Renewed February 10, 1909. Serial No. 477,250.

*To all whom it may concern:*

Be it known that I, ARTHUR R. CLARKSON, a citizen of the United States, and resident of St. Louis, Missouri, have invented certain new and useful Improvements in Pole-Braces, of which the following is a specification.

This invention relates to improvements in pole braces, and consists in the novel arrangement, construction and combination of parts as will be fully hereinafter described and claimed.

The object of my invention is to construct a brace to be used in connection with folding poles adaptable for tent use and so arranged as to support the pole when in an extended position.

Figure 1, is a perspective view of my complete invention, showing it in position on an extended pole. Fig. 2, is a perspective view with the pole bolts. Fig. 3, is a perspective view of the brace, showing the pole in an extended position. Fig. 4 is a detail perspective view of the brace.

In the construction of my invention, I provide a brace preferably formed of a single strip of material, preferably stamped, and then shaped to conform with the outer contour of the pole.

The brace when formed, is provided with the shank 5, provided with screw apertures 6, by which the same is retained in position upon one of the pole sections 7, the shank is also provided with a bolt aperture 8, through which is inserted a bolt or rivet 9, passing through the pole section 7, and the pole section 10 acting as a pivot, so that both pole sections 7 and 10 may be folded as shown in Fig. 2, or extended as shown in Figs. 1 and 3.

From the shank 5 extends an arm 11, preferably formed at right angles, the same being bent upwardly at the point indicated by the numeral 12, forming a vertical portion 13, the arm is again bent at the point indicated by the numeral 14, forming a horizontal overlapping portion 15. The arm 11, when so bent forms a loop of sufficient size to admit the insertion of the pivotal pole section 10, and when the pole section 10, is in an extended position, as shown in Figs. 1 and 3, the loop formed on the brace will retain the pole in the extended position when said pole is placed on an angle to form the tent, the poles being placed in a position so that the portion 13 of the loop is upward.

By use of a number of these braces, a tent pole can be made an unlimited length.

Having fully described my invention, what I claim is:

As an improved article of manufacture, the combination with the pole sections 7 and 10, of the single stamped metal strip 5 having its shank provided with a plurality of screw apertures 6 and the bolt aperture 8 adapted to receive the bolt 9; the arm 11 formed integral with the shank or body portion 5 and lying in the plane thereof, said arm 11 extending beyond and at right angles to the inner edge of the shank 5; the vertical member 13 of the arm 11 integral therewith, and formed at substantially an angle of 90 degrees thereto; the horizontal overlapping member 15 formed integral with the vertical member 13 and at right angles thereto, substantially as described and for the purpose set forth.

In testimony whereof, I have signed my name to this specification, in presence of two subscribing witnesses.

ARTHUR R. CLARKSON.

Witnesses:
　ALFRED A. EICKS,
　WALTER C. STEIN.